United States Patent
Paddick

(10) Patent No.: US 11,502,497 B2
(45) Date of Patent: Nov. 15, 2022

(54) CABLE GLAND

(71) Applicant: Prysmian S.p.A., Milan (IT)

(72) Inventor: Nathan Paddick, Milan (IT)

(73) Assignee: Prysmian S.p.A., Milan (IT)

( * ) Notice: Subject to any disclaimer, the term of this patent is extended or adjusted under 35 U.S.C. 154(b) by 808 days.

(21) Appl. No.: 16/424,770

(22) Filed: May 29, 2019

(65) Prior Publication Data

US 2019/0372329 A1 Dec. 5, 2019

(30) Foreign Application Priority Data

Jun. 1, 2018 (IT) ........................ 102018000005960

(51) Int. Cl.
*H02G 15/04* (2006.01)
*G02B 6/44* (2006.01)
*H02G 15/007* (2006.01)

(52) U.S. Cl.
CPC ........... *H02G 15/04* (2013.01); *G02B 6/4471* (2013.01); *H02G 15/007* (2013.01)

(58) Field of Classification Search
CPC ..... H02G 15/04; H02G 15/043; H02G 15/007
See application file for complete search history.

(56) References Cited

U.S. PATENT DOCUMENTS

| | | | | |
|---|---|---|---|---|
| 4,842,364 A * | 6/1989 | Chen | .................... | G02B 6/3807 385/136 |
| 6,268,565 B1 * | 7/2001 | Daoud | ................. | H02G 3/0675 285/348 |
| 6,462,275 B1 * | 10/2002 | Daoud | .................... | H02G 3/088 439/604 |
| 9,312,672 B2 | 4/2016 | Hill et al. | | |
| 9,510,491 B2 * | 11/2016 | Natter | .................. | H05K 9/0098 |
| 10,094,491 B1 * | 10/2018 | Crounse | ................. | H02G 3/0431 |
| 2013/0240684 A1 * | 9/2013 | Meyers | .................... | H02G 3/32 248/74.1 |
| 2015/0083486 A1 | 3/2015 | Hill et al. | | |

(Continued)

FOREIGN PATENT DOCUMENTS

| | | |
|---|---|---|
| DE | 100 27 486 A1 | 12/2001 |
| EP | 2 902 827 A1 | 8/2015 |
| WO | WO 2015/068581 A1 | 5/2015 |

OTHER PUBLICATIONS

Italian Search Report dated Jan. 7, 2019 in Italian Application 201800005960, filed on Jun. 1, 2018 (with English Translation of Categories of Cited Documents & written Opinion).

*Primary Examiner* — Chau N Nguyen
(74) *Attorney, Agent, or Firm* — Oblon, McClelland, Maier & Neustadt, L.L.P.

(57) ABSTRACT

A cable gland for securing a cable to a box comprises a tightening element configured to surround the cable, the tightening element having at least two connecting ends mutually approachable to tighten the tightening element on the cable, and a gland body extending along an axial direction between a first end and a second end, the gland body defining a passing through channel extending along the axial direction between the first end and the second end and configured to receive the cable passing through the first and second ends, the gland body surrounding at least partially the tightening element. The cable gland comprises a first locking arrangement configured to lock along the axial direction the gland body relative to the tightening element.

12 Claims, 7 Drawing Sheets

(56) References Cited

U.S. PATENT DOCUMENTS

2016/0181725 A1* 6/2016 Kao .................. H01R 13/5804
                                                                                         439/460
2016/0336682 A1* 11/2016 Markefka ............ H02G 3/0691
2018/0109093 A1    4/2018 Gibson

* cited by examiner

CABLE GLAND

FIELD OF THE INVENTION

The present invention relates to the field of equipment and components for the insertion of optical cables in optical network closures, e.g. into an optical joint closure, optical network terminal, FTTA Hybrid distribution box or others optical junction boxes. In particular, the present invention relates to a cable gland.

BACKGROUND OF THE INVENTION

Typically, optical cables enter into optical network closures through cable glands, which are intended to provide a safe mechanical connection of the cable to the optical network closure.

In order to avoid that external forces may cause the cable to be disconnected from the optical network closure, a strength member is required. Specifically, the cable contains a strength member configured to be fixed on the cable gland in order to secure the cable to the connection box.

Frequently, the hybrid cables, such as those used in Fiber To The Antenna (FTTA) applications, do not contain the additional strength member as a standard optical fibre cable. With these hybrid cables, the cable gland should secure the cable to the connection box without the strength member. In particular, in order to avoid the cable retraction, a sufficient clamping force is required between the cable gland and the cable.

U.S. Pat. No. 6,487,344 discloses a watertight inlet device for inserting a cable containing optical fibers into a chamber or a container, e.g. into a splice box. The device includes a metal solepiece for securing the strength members of the optical cable, and which plugs into and fixes to a tubular sealing body equipped with an external O-ring gasket and having its rear portion shaped to form a sealing stuffing box on the outer sheath of the cable. The rear of the nut of the stuffing box receives a clamp for retaining the cable. Once the device has been fitted, the resulting assembly is inserted into the inlet passageway until it abuts against a shoulder in the passageway. Then only the head of the securing solepiece and a groove in the body project inside the container, the groove then receiving a key or fork for retaining the assembly.

EP 2902827 discloses a cable gland adapted to be secured to an optical joint closure. The cable gland comprises a central body longitudinally extended between a first end and a second end and configured for receiving a cable passing through these ends, wherein when the body is partially inserted in the optical joint closure, the first end is positioned inside the inner volume of the optical joint closure and the second end is positioned outside the optical joint closure, and a cable securing assembly configured to cooperate with the first end so that the cable securing assembly is attachable to the central body in order to retain and secure said optical cable.

WO 2018047107 discloses a cable gland device for the electric interconnection of electric cables comprises. The cable gland comprises a first body made of an electrically insulating material having a first passage channel of an electric cable and a first tightening means of the electric cable inside the first passage channel. The cable gland further comprises a second body made of an electrically insulating material which comprises a second passage channel of the electric cable and is couplable to the first body for the activation of the first tightening means. Specifically, the second body comprises the second tightening means of the electric cable inside the second passage channel.

SUMMARY OF THE INVENTION

The Applicant has tackled the problem of providing a cable gland capable of tightening a cable without the strength member and providing a firm and reliable engagement between the cable and the gland, avoiding torsion or movements of the cable relative to the cable gland.

The Applicant has found that providing a tightening element for a cable surrounded by a gland body and a locking arrangement for axially locking the tightening element and the gland body, a firm and reliable engagement between the cable and the gland is assured, reducing or avoiding any relative movement of the cable gland and cable.

Therefore, the present invention relates to a cable gland for securing a cable to a box, the cable gland comprising a tightening element configured to surround the cable, the tightening element having at least two connecting ends mutually approachable to tighten the tightening element on the cable, a gland body extending along an axial direction between a first end and a second end, the gland body defining a passing through channel extending along the axial direction between the first end and the second end and configured to receive the cable passing through the first and second ends, the gland body surrounding at least partially the tightening element, the cable gland comprises a first locking arrangement configured to lock along the axial direction the gland body relative to the tightening element, wherein the tightening element comprises first friction members configured to engage the cable.

Preferably, the tightening element has an outer surface facing the gland body and an inner surface facing the cable, the first friction members project from the inner surface.

Preferably, the first locking arrangement comprises a first locking element and a second locking element, the first locking element of the first locking arrangement comprises a protrusion and the second locking element of the first locking arrangement comprises a seat configured to receive and engage with the protrusion to axially lock the gland body relative to the tightening element.

Preferably, the first locking element of the first locking arrangement is associated with the tightening element and the second locking element of the first locking arrangement is associated with the gland body.

Preferably, the first locking arrangement is arranged at the first end of the gland body.

Preferably, the tightening element comprises a first semi annular member and a second semi annular member and connecting elements for mutually connecting the first and second semi annular members and tightening the tightening element on the cable.

Preferably, each first and second semi annular member has two connecting ends, the connecting ends of the first semi annular member are configured to be approached to the connecting ends of the second semi annular member through the connecting elements to tighten the tightening element on the cable.

Preferably, a seal is configured to surround the cable, the gland body at least partially surrounding the seal at the second end.

Preferably, an annular member is arranged at the second end and is configured to surround and engage the cable, the annular member surrounds at least partially the gland body at the second end, a second locking arrangement is provided and configured to lock along the axial direction the gland body relative to the annular member.

Preferably, the annular member comprises second friction members configured to engage the cable.

Preferably, the second locking arrangement comprises a first locking element and a second locking element, the first locking element of the second locking arrangement comprises a protrusion and the second locking element of the second locking arrangement comprises a seat configured to receive and engage with the protrusion to axially lock the gland body relative to the annular member.

Preferably, the first locking element of the second locking arrangement is associated with the gland body and the second locking element of the second locking arrangement is associated with the annular member.

Preferably, the second locking arrangement is arranged at the second end of the gland body.

Preferably, the gland body comprises a heat-shrinkable sleeve surrounding at least partially the gland body at the first end and the cable.

BRIEF DESCRIPTION OF THE DRAWINGS

The present invention will now be described in more detail hereinafter with reference to the accompanying drawings, in which some embodiments of the invention are shown.

DETAILED DESCRIPTION

Figure 1:
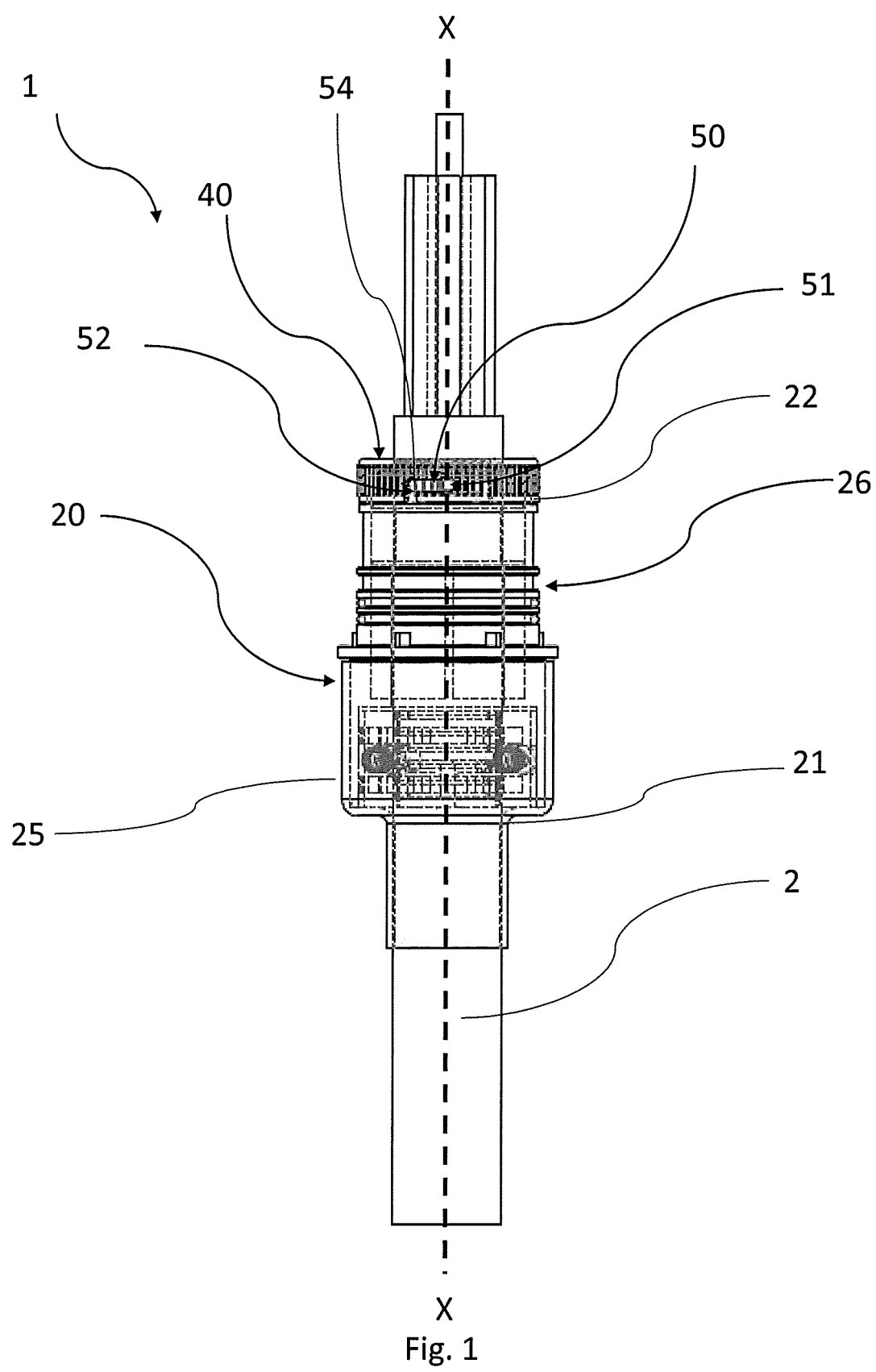
FIG. 1 is a schematic view of a cable gland in an assembled configuration on a cable according to one embodiment of the present invention.
Figure 2:
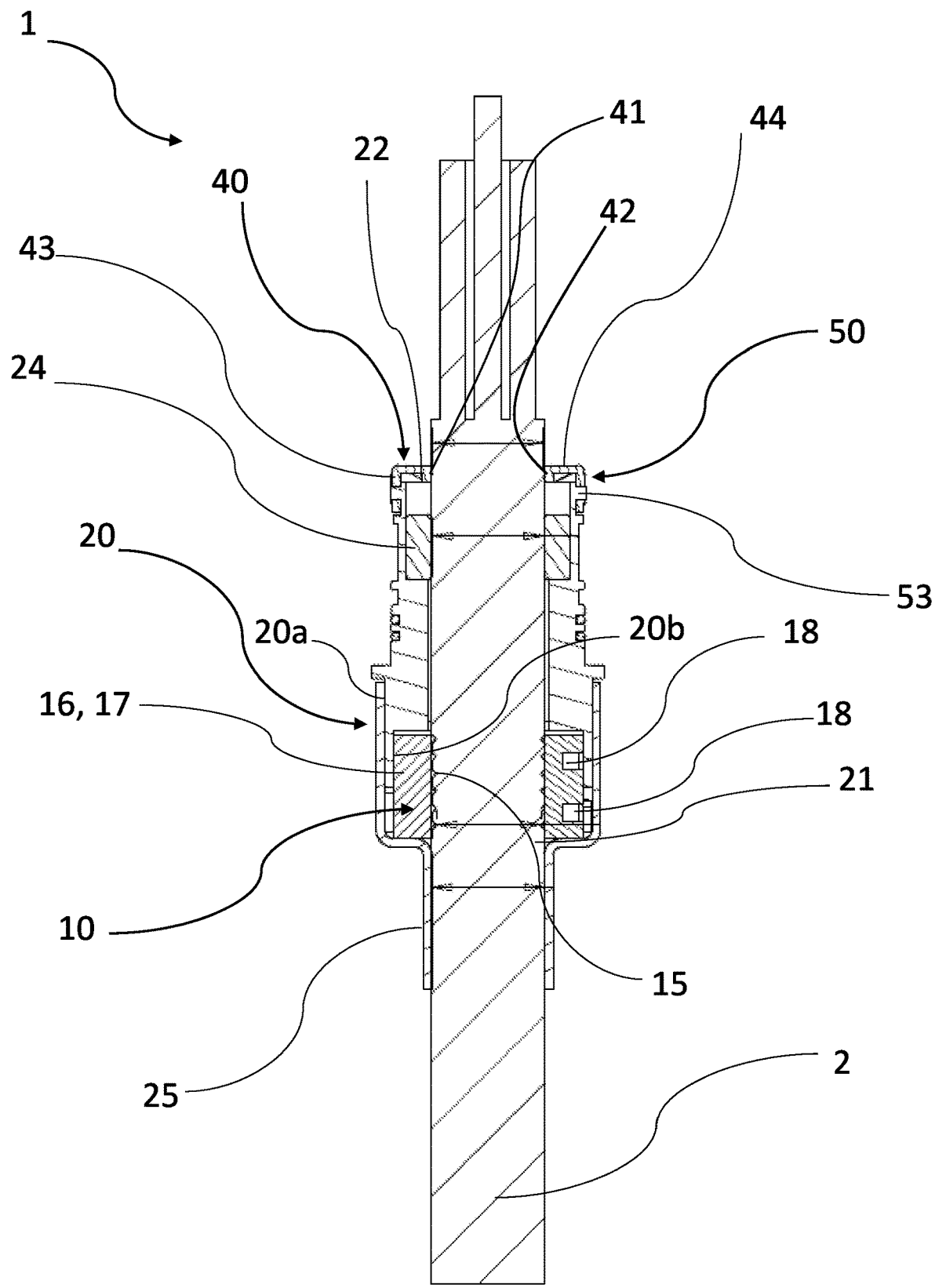
FIG. 2 is a first section view of the cable gland of FIG. 1.
Figure 3:
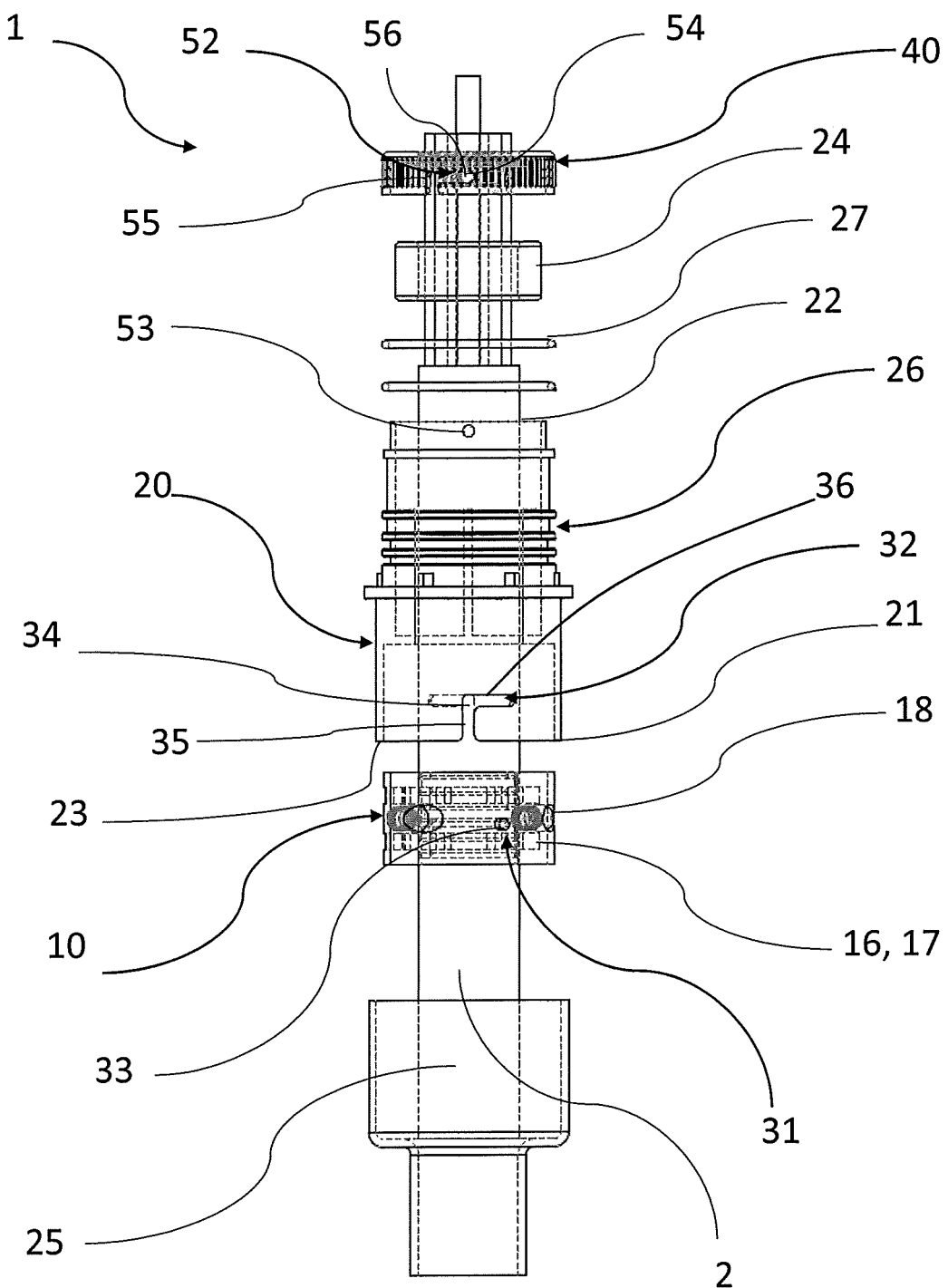
FIG. 3 is an exploded view of the cable gland of the FIG. 1.
Figure 4:
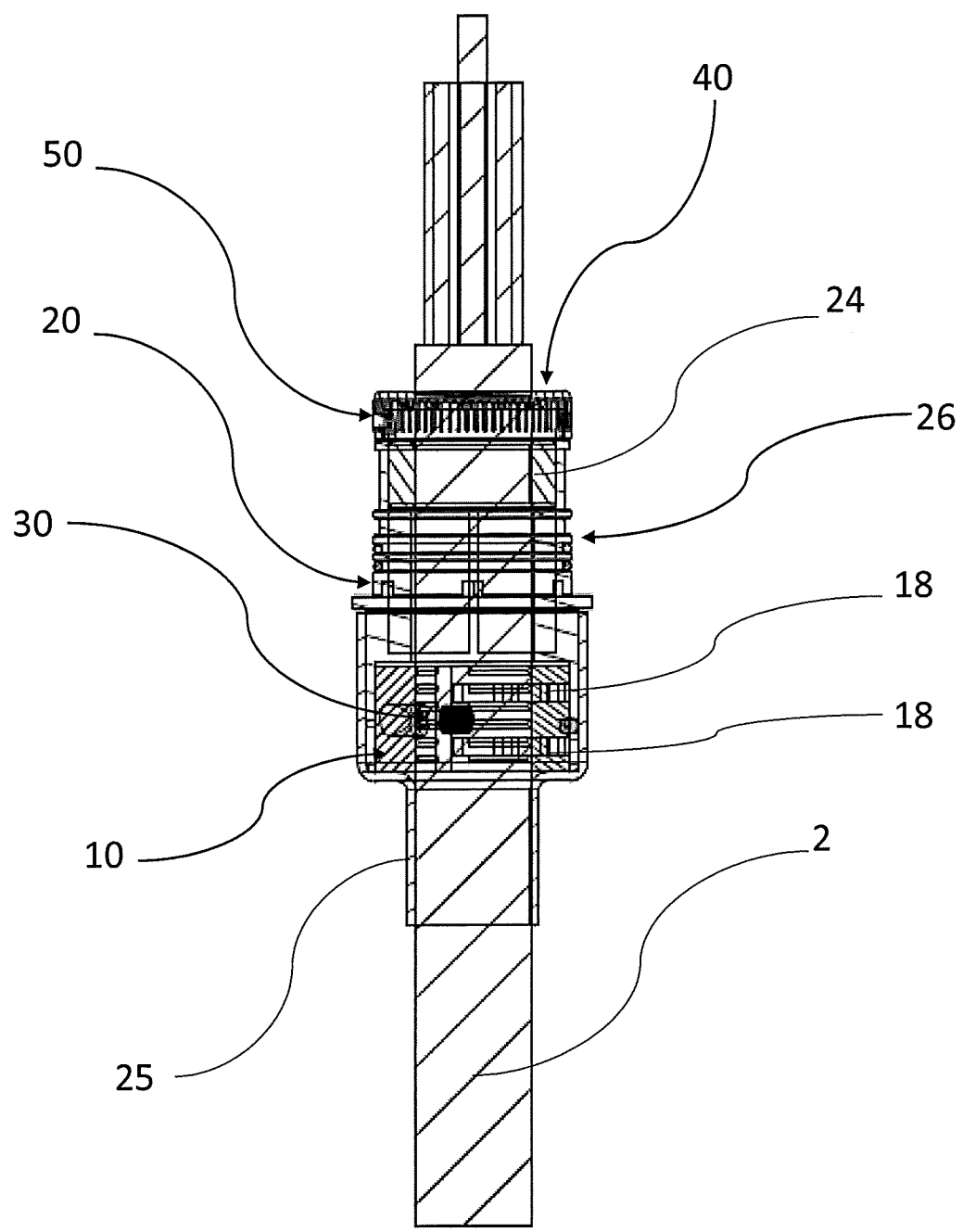
FIG. 4 is a second section view of the cable gland of FIG. 1.
Figure 5:
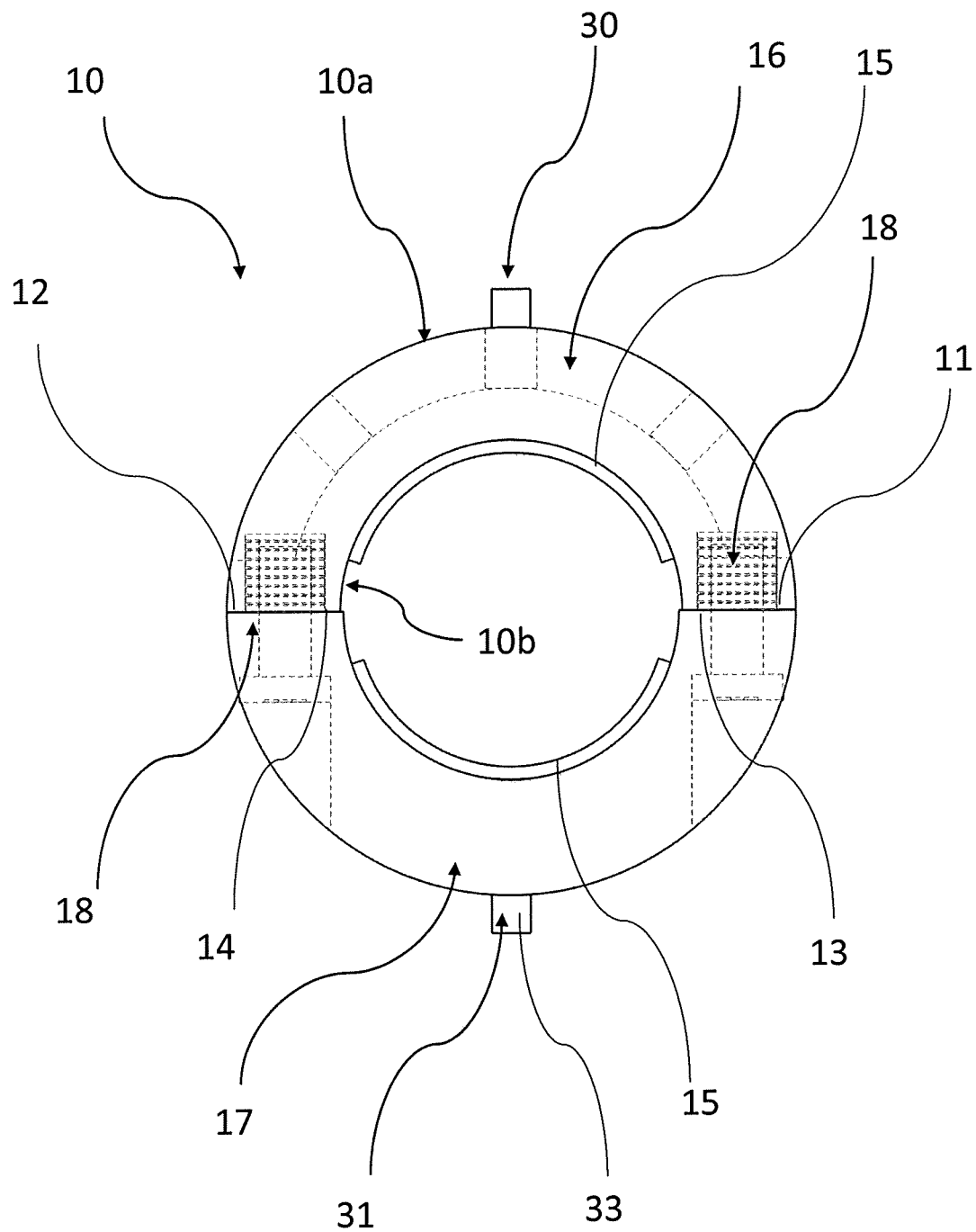
FIG. 5 is a front view of a component of the cable gland of FIG. 1.
Figure 6:
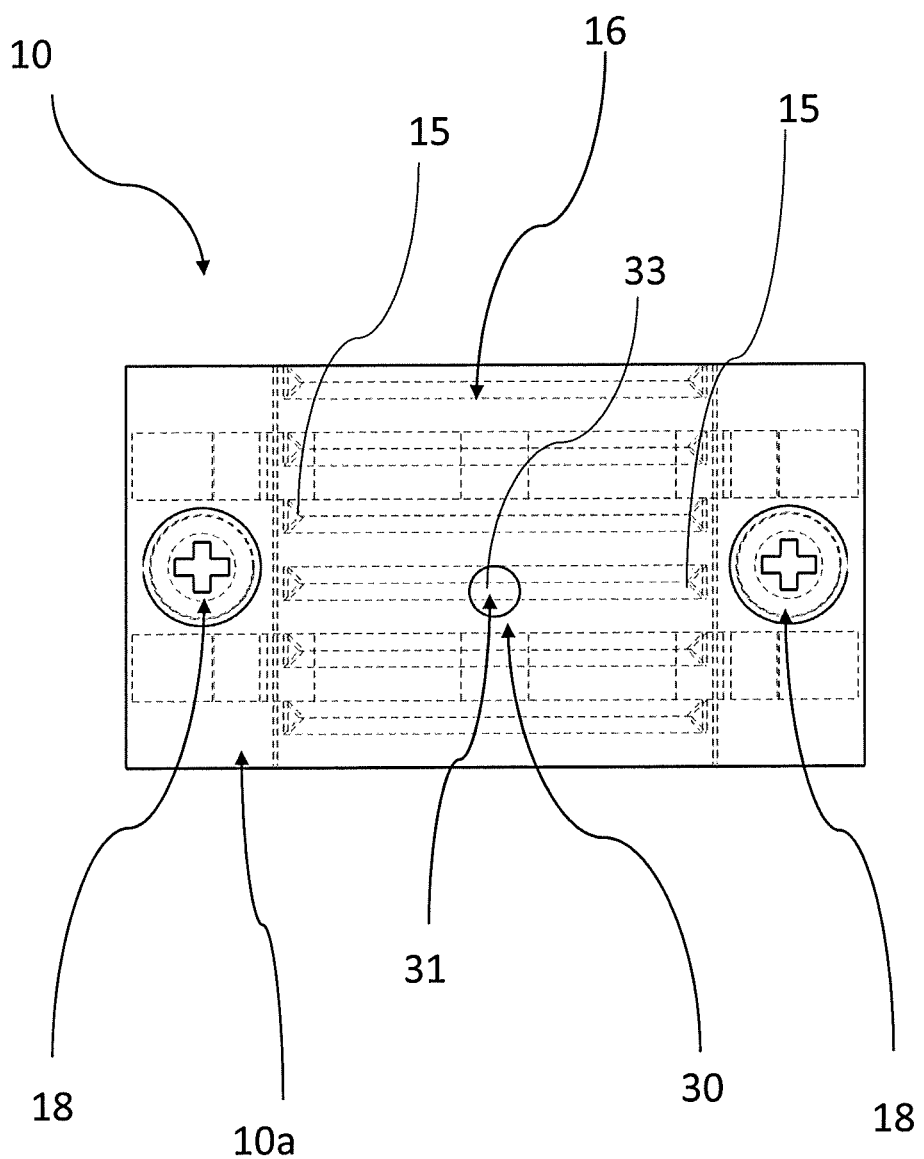
FIG. 6 is a top view of the component of FIG. 5
Figure 7:
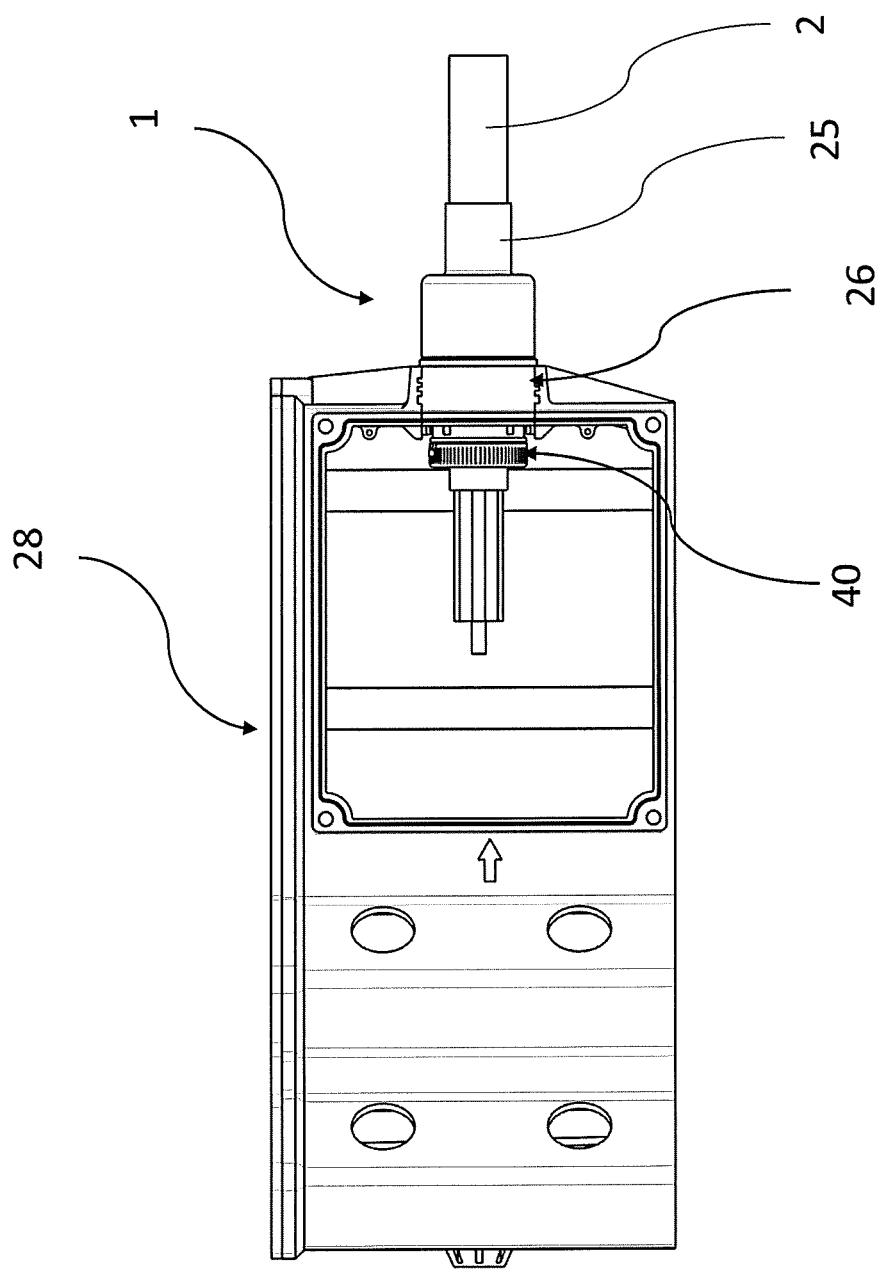
FIG. 7 is schematic view of the cable gland FIG. 1 in an assembled configuration when connected to a connection box.

The FIG. 1 shows a cable gland 1 adapted to secure a cable 2 to a connection or distribution box 28. The cable 2 can be an electric cable, a hybrid cable or an optical fibre cable.

The cable gland 1 comprises a tightening element 10 and a gland body 20.

The tightening element 10 is associated to the gland body 20 and is configured to surround the cable 2 and to be tightened on the cable 2.

According to the one embodiment, the tightening element 10 comprises a first semi annular member 16 and a second semi annular member 17 and connecting elements 18 for mutually connecting the first semi annular member 16 and the second semi annular members 17, thereby tightening the tightening element 10 on the cable 2.

In particular, the first semi annular member 16 has two connecting ends 11, 12 and the second semi annular member 17 has two connecting ends 13, 14.

The connecting ends 11, 12 of the first semi annular member 16 are configured to be approached to the connecting ends 13, 14 of the second semi annular member 17 through the connecting elements 18 to tighten the tightening element 10 on the cable 2. Therefore, approaching the connecting ends 11, 12, 13, 14 of the tightening element 10 increases the tightening of the tightening element 10 on the cable 2.

Preferably, the connecting elements 18 comprise fastening screws (not shown) passing through holes (not shown) formed in the semi annular members 16, 17.

Advantageously, the connecting elements 18 allow to adjust the compression exerted on the cable 2 by the tightening element 10 and, therefore, to adjust the tightening of the tightening element 10 on the cable 2.

The tightening element 10 has an outer surface 10a facing the gland body 20 and an inner surface 10b facing the cable 2.

The inner surface 10b comprises friction members 15 configured to increase the grip of the tightening element 10 on the cable 2. Preferably the friction members 15 are protrusions projecting from the inner surface 10b of the tightening element 10 towards the cable 2.

Approaching the connecting ends 11, 12, 13, 14 of the tightening element 10 allows the protrusions 15 to act on the outer surface of the cable 2 and increases the gripping force of the tightening element 10 on the cable 2, thereby avoiding torsion and movements of the cable 2 relative to the tightening element 10.

According to an alternative embodiment, the gland body 20 is shaped so as to mutually approach and keep mutually approached the connecting ends 11, 12, 13, 14 of the tightening element 10 and thereby tightening the tightening element 10 on the cable 2. For example, the inner surface 10b of the tightening element 10 may be tapered so that the tapered inner surface 10b forces the connecting ends 11, 12, 13, 14 to mutually approach and tighten the tightening element 10 on the cable 2.

The gland body 20 extends along an axial direction X-X between a first end 21 and a second end 22 opposed to the first end 21.

Preferably, the gland body 20 comprises a connecting portion 26 configured to connect the gland body 20 with a box 28, such as a distribution box, or to an optical joint closure.

The gland body 20 has an outer surface 20a and an opposite inner surface 20b facing the tightening element 10, in particular the inner surface 10b of the tightening element 10.

The gland body 20 defines a passing through channel 23 extending between the first end 21 and the second end 22 along the axial direction X-X. The passing through channel 23 is configured to receive the cable 2 passing through the first end 21 and the second end 22.

The gland body 20 at least partially surrounds the tightening element 10, preferably at the first end 21. The tightening element 10 is therefore arranged in the passing through channel 23.

Preferably, the gland body 20 completely surrounds the tightening element 10.

The cable gland 1 comprises a first locking arrangement 30 configured to axially lock the tightening element 10 relative to the gland body 20. Thanks to this arrangement 30, the tightening element 10 is firmly attached to the gland body 20 and assures a firm and reliable engagement between the cable 2 and the gland body 20.

The first locking arrangements 30 is preferably arranged at the first end 21 of the gland body 20.

The first locking arrangement 30 comprises a first locking element 31 and a second locking element 32. In the embodiment shown in the figures, the first locking element 31 is associated with the tightening element 10 and the second locking element 32 is associated with the gland body 20. Alternatively, the first locking element 31 is associated with the gland body 20 and the second locking element 32 is associated with the tightening element 10.

The first locking element 31 and the second locking element 32 are configured to engage in order to lock the tightening element 10 relative to gland body 20.

Preferably, the first locking element 31 comprises a protrusion 33 and the second locking element 32 of the first locking arrangement 30 comprises a seat 34 configured to receive and engage with the protrusion 33 to axially lock the gland body 20 relative to the tightening element 10. In particular, the seat 34 comprises a first seat portion 35 extending along the axial direction X-X and configured to receive the protrusion and a second seat portion 36, joined to the first seat portion 35 and extending annularly along a direction perpendicular to the axial direction X-X to hold the protrusion 33. The first seat portion 35 allows an axial translation of the gland body 20 relative to the tightening element 10 while the second seat portion 36 allows lock of the gland body 20 relative to the tightening element 10. This also allows to easily lock and unlock the gland body 20 relative to tightening element 10.

Advantageously, the first locking arrangement 30 allows a further compression of the tightening element 10 on the cable 2 and so increases the tightening of the cable gland 1 on the cable 2.

According to the embodiment shown in the figures, the first locking element 31 comprises two protrusions 33, preferably two pins, projecting from the inner surface 10b of tightening element 10 and the second locking element 33 comprises two seats 34, preferably two slots, at the first end 21 of the gland body 20.

The cable gland 1 further comprises a seal 24 configured to surround the cable 2 and arranged in the passing through channel 23 at the second end 22.

The gland body 20 at least partially surrounds the seal 24 at the second end 22.

Preferably the gland body 20 completely surrounds the seal 24.

Preferably, the seal 24 and the passing through channel 23 define an interference fit, so as to better tighten and secure the cable 2.

Preferably, the seal 24 has an annular shape and is configured to be mounted inside the passing through channel 23 to surround the cable, thereby providing additional retaining force between the cable 2 and the gland body 20.

Preferably, the seal 24 is made of rubber or any other suitable sealing material.

The cable gland 1 further comprises an annular member 40 which is arranged at the second end 22 and configured to surround and engage the cable 2.

The annular member 40 surrounds at least partially the gland body 20 at the second end 22.

A second locking arrangement 50 is provided and configured to lock along the axial direction X-X the gland body 20 relative to the annular member 40.

According to one embodiment, the annular member 40 comprises an inner sleeve 42, an outer sleeve 43 and a transverse wall 44 extending between the inner sleeve 42 and outer sleeve 43.

The inner sleeve 42 engages the cable 2 and, preferably, comprises friction members 41 configured to increase the grip of the annular member 40 on the cable 2.

The cable gland 1 comprises a second locking arrangement 50 configured to axially lock the gland body 20 relative to the annular member 40. The second locking arrangement 50 is located at the second end 22 of the gland body 20. Thanks to this second locking arrangement 50, the seal 24 is firmly held inside the gland body 20 and the annular member 40 avoids torsion and movements of the cable 2 relative to the cable gland 20.

The second locking arrangement 50 is preferably arranged at the second end 22 of the gland body 20.

The second locking arrangement 50 comprises a first locking element 51 and a second locking element 52. In the embodiment shown in the figures, the first locking element 51 is associated with the gland body 20 and the second locking element 52 is associated with the annular member 40. Alternatively, the first locking element 51 is associated with the annular member 40 and the second locking element 52 is associated with the gland body 20.

The first locking element 51 and the second locking element 52 are configured to engage in order to lock the annular member relative to gland body 20.

Preferably, the first locking element 51 comprises a protrusion 53 and the second locking element 52 comprises a seat 54 configured to receive and engage with the protrusion 53 to axially lock the gland body 20 relative to the annular member 40. In particular, the seat 54 comprises a first seat portion 55 extending along the axial direction X-X and configured to receive the protrusion 53 and a second seat portion 56, joined to the first seat portion 55 and extending annularly along a direction perpendicular to the axial direction X-X to hold the protrusion 53. The first seat portion 55 allows an axial translation of the annular member 50 relative to the gland body 20 while the second seat portion 56 allows axial lock of the annular member 40 relative to the gland body 20. This also allows to easily lock and unlock the gland body 20 relative to annular member 40.

Advantageously, the second locking arrangement 50 allows a further compression of the seal 24 on the cable 2 and so increases the tightening and seal of the cable gland 1 on the cable 2.

According to one embodiment, the first locking element 51 of the second locking arrangement 50 comprises two protrusions 53, preferably two pins, projecting from the outer surface 10b of the gland body 10 at the second end 22 and the second locking element 52 of the second locking arrangement 50 comprises two seats 54, preferably two lots, formed in the outer sleeve 43.

According to one embodiment, the cable gland 1 comprises a heat-shrinkable sleeve 25 surrounding at least partially the gland body 20, at the first end 21, and the cable 2. The heat-shrinkable sleeve 25 is configured to protect the cable gland 2 against water or solids.

Advantageously, the heat-shrinkable sleeve 25 increases the tightening force between the gland body 20 and the tightening element 10, reducing relative torsion between the gland body 20, the tightening element 10 and the cable 2.

The cable gland 1 is assembled by mounting each component on an end of the cable 2. Preferably the heat-shrinkable sleeve 25 is mounted firstly, then the tightening element 10, the gland body 20, the seal 24 and the annular member 40.

After the heat-shrinkable sleeve 25 is mounted, the tightening element 10 is tightened on the cable 2 by means of the fastening screws. Alternatively, the cable gland 20 is mounted on the tightening element 10 and tightening is obtained through the tapered inner surface 20b of the gland body 20.

The gland body 20 is then locked relative to the tightening element 10 through the first locking arrangement 30. Then, preferably, the heat-shrinkable sleeve 25 is moved along the axial direction X-X towards the gland body 20 in order to cover the gland body 20 and the heat-shrinkable sleeve 25 is shrunk around the cable gland 20 by a heat treatment.

Then the seal 24 is inserted with interference inside the gland body 20 at the second end 22 and the annular member 40 is mutually locked relative to the gland body 20 at the second end 22. Finally, the assembled cable gland 1 is connected to the box 28 through the connecting portion 26.

Preferably, further seals 27 are positioned between the cable gland 1 and the box 28 in order to protect the box 28 and the cable gland 1 against water flow or other type intrusions.

The invention claimed is:

1. A cable gland for securing a cable to a box, the cable gland comprising:
 a tightening element configured to surround the cable, the tightening element having at least two connecting ends mutually approachable to tighten the tightening element on the cable,
 a gland body extending along an axial direction between a first end and a second end, the gland body defining a passing through channel extending along the axial direction between the first end and the second end and configured to receive the cable passing through the first and second ends, the gland body surrounding at least partially the tightening element, and
 a first locking arrangement configured to lock along the axial direction the gland body relative to the tightening element, wherein
 the tightening element comprises first friction members configured to engage the cable,
 an annular member is arranged at the second end and is configured to surround and engage the cable,
 the annular member surrounds at least partially the gland body at the second end,
 a second locking arrangement is provided and configured to lock along the axial direction the gland body relative to the annular member, and
 the annular member comprises second friction members configured to engage the cable.

2. The cable gland according to claim 1, wherein:
 the tightening element has an outer surface facing the gland body and an inner surface facing the cable;
 the first friction members project from the inner surface.

3. The cable gland according to claim 1, wherein:
 the first locking arrangement comprises a first locking element and a second locking element,
  the first locking element of the first locking arrangement comprises a protrusion and the second locking element of the first locking arrangement comprises a seat configured to receive and engage with the protrusion to axially lock the gland body relative to the tightening element.

4. The cable gland according to claim 3, wherein:
 the first locking element of the first locking arrangement is associated with the tightening element and the second locking element of the first locking arrangement is associated with the gland body.

5. The cable gland according to claim 1, wherein the first locking arrangement is arranged at the first end of the gland body.

6. The cable gland according to claim 1, wherein the tightening element comprises a first semi annular member and a second semi annular member and connecting elements for mutually connecting the first and second semi annular members and tightening the tightening element on the cable.

7. The cable gland according to claim 6, wherein each first and second semi annular member has two of the connecting ends, the connecting ends of the first semi annular member are configured to be approached to the connecting ends of the second semi annular member through the connecting elements to tighten the tightening element on the cable.

8. The cable gland according to claim 1, wherein a seal is configured to surround the cable, the gland body at least partially surrounding the seal at the second end.

9. The cable gland according to claim 1, wherein:
 the second locking arrangement comprises a first locking element and a second locking element,
 the first locking element of the second locking arrangement comprises a protrusion and the second locking element of the second locking arrangement comprises a seat configured to receive and engage with the protrusion to axially lock the gland body relative to the annular member.

10. The cable gland according to claim 9, wherein:
 the first locking element of the second locking arrangement is associated with the gland body and the second locking element of the second locking arrangement is associated with the annular member.

11. The cable gland according to claim 1, wherein the second locking arrangement is arranged at the second end of the gland body.

12. The cable gland according to claim 1, wherein the gland body comprises a heat-shrinkable sleeve surrounding at least partially the gland body at the first end and the cable.

* * * * *